United States Patent [19]

Clark et al.

[11] Patent Number: 4,748,097
[45] Date of Patent: May 31, 1988

[54] METHOD OF PREPARING A HOLOGRAM

[75] Inventors: John A. Clark, Altrincham; Alan Adshead, New Mills; David W. Butcher, Goostrey, all of England

[73] Assignee: Ciba-Geigy AG, Basel, Switzerland

[21] Appl. No.: 877,954

[22] Filed: Jun. 24, 1986

[30] Foreign Application Priority Data

Jun. 25, 1985 [GB] United Kingdom ................. 8516054

[51] Int. Cl.$^4$ .......................... G03H 1/04; G03C 5/38; G03C 5/42; G03C 5/44
[52] U.S. Cl. ............................................ 430/1; 430/2; 430/393; 430/419; 430/460; 430/461
[58] Field of Search ...................... 430/1, 2, 430, 419, 430/460, 461, 393

[56] References Cited

U.S. PATENT DOCUMENTS

| | | | |
|---|---|---|---|
| 3,335,004 | 8/1967 | Wrisley et al. | 430/460 X |
| 3,615,508 | 10/1971 | Stephen et al. | 430/460 X |
| 3,702,247 | 11/1972 | Williams et al. | 430/460 X |
| 4,025,345 | 5/1977 | Kido et al. | 430/461 X |
| 4,524,129 | 6/1985 | Kishimoto et al. | 430/460 X |

Primary Examiner—Mukund J. Shah
Attorney, Agent, or Firm—Wenderoth, Lind & Ponack

[57] ABSTRACT

A method of preparing a hologram which comprises subjecting holographic material to a holographic exposure, the holographic material comprising silver halide emulsion of which at least 80% by weight of the halide is bromide, developing the exposed material in a silver halide developing solution to yield developed silver, converting the developed silver to silver chloride using a bleaching agent selected from ferric ions, persulphate ions, chlorate ions, peroxides and water-soluble quinones, in the presence of chloride ions and then fixing out the silver chloride using a silver halide fixing agent which dissolves silver chloride but not silver bromide or silver iodobromide under the conditions of use.

6 Claims, No Drawings

METHOD OF PREPARING A HOLOGRAM

The present invention relates to a method of preparing a hologram. Holograms can be made using very fine grain silver halide sensitised photographic material by subjecting the material to a holographic exposure using a laser to produce simultaneously an object and a reference beam. A series of interference fringes are set up which may be fixed in the material by a photographic developing step. These fringes may be used to reconstruct a hologram using either coherent or incoherent light depending on the exposure conditions employed.

Amplitude holograms are obtained when the developed silver is left in the photographic material and is used to reconstruct the holographic image. However, brighter holograms may be obtained when the developed silver is removed from material. In this case the unexposed silver halide is used to reconstruct the holographic image. A hologram which has been produced by this method is called a phase hologram.

Many holograms and especially phase reflection holograms are used for display purposes and such holograms are required to be as bright as possible. Bright holograms are those which have low scatter, and have a high diffraction efficiency.

Bright holograms can be obtained when the silver halide employed in the material is of very small crystal grain size and the method of processing involves the use of a solvent bleach which removes both the imagewise developed silver and also any non-imagewise developed silver (fog).

In order to obtain the desirably small silver halide crystal the silver halide employed in the photographic material usually contains a large amount of bromide. Very often silver iodobromide crystals are used, the bromide content being at least 80% by weight.

In the usual method of preparing a phase hologram a strong solvent bleach is required to remove the developed silver without removing the undeveloped silver halide. Most of these solvent bleaches are ecologically unsuitable. For example the most commonly used solvent bleach is an acidified dichromate solution and expensive procedures must be adopted for dealing with used dichromate solutions.

We have found a method for processing holograms which retains the advantages which would be obtained using a solvent bleach, but which does not in fact use a solvent bleach.

According to the present invention there is provided a method of preparing a hologram which comprises subjecting holographic material to a holographic exposure, the holographic material comprising silver halide emulsion of which at least 80% by weight of the halide is bromide, developing the exposed material in a silver halide developing solution to yield developed silver, converting the developed silver to silver chloride using a bleaching agent selected from ferric ions, persulphate ions, permanganate ions, bromate ions, chlorate ions, peroxides and water-soluble quinones, in the presence of chloride ions and then fixing out the silver chloride using a silver halide fixing agent which dissolves silver chloride but not silver bromide or silver iodobromide under the conditions of use.

A particularly suitable fixing agent which dissolves silver chloride but not silver bromide is a water soluble sulphite for example sodium sulphite.

Sodium sulphite can be used under all conditions. However it is possible to use sodium thiosulphite as a weak solution e.g. as a solution which comprises 0.02 to 0.06 molar thiosulphate and/or for a short fixing time for example from 0.5 to 1.5 minutes. Under such conditions the chloride will be dissolved or fixed out but the bromide or iodobromide will be untouched. However ammonium thiosulphate can not be so used. Also certain amines which are known to dissolve halides such as uracil can be used as long as the fixing time is comparatively short for example less than two minutes so as not to dissolve any of the bromide or iodobromide crystals.

Examples of suitable bleaching agents are persulphates for example sodium and potassium persulphate, ferric salts for example ferric nitrate, ferric chloride and ferric sulphate, peroxides for example hydrogen peroxide, water-soluble quinones for example parabenzo quinone, chlorates for example sodium and potassium chlorate.

The preferred bleaching agent is a ferric salt as these salts are cheap, entirely non toxic and thus present no waste nor effluent problems. The ferric ions must be present as salts of acids and not as ferric complexes such as ferric EDTA. Further they can be formulated to form stable solutions and thus it is not required to make up fresh ferric solutions every time holographic material is processed by the method of the present invention.

A particularly useful ferric salt to use is ferric nitrate.

Preferably after the fixing process the holographic material is water washed and dried.

In the method of the present invention the residual silver halide particles are the same size after processing as before and have not been enlarged as in some other rehalogenating processes. Thus the material is inherently low scattering. Any photographic type fog is removed during the bleaching and fixing steps. As the silver halide in the exposed areas is converted to developed silver, oxidised and then fixed out a net shrinkage of the emulsion layer and compression of the interference fringe spacing occurs. This causes a shift to shorter wavelength between the exposure wavelength and the replay wavelength when the hologram is made as a reflection hologram.

The following Example will serve to illustrate the invention.

EXAMPLE

Holographic material was prepared by coating onto a transparent photographic film base a gelatino silver halide emulsion which was substantially pure silver bromide having a mean crystal size of 0.035 microns at a silver coating weight of 30 mg/dm$^2$. The emulsion was optically sensitised with a red sensitising dye so that it was optimally sensitive to 633 mm the colour of a He:Ne laser.

This material was holographically exposed by a He:Ne laser using a Denisyuk exposure method and a brushed aluminium plate as an object to yield (after processing) a reflection hologram.

The sample was developed in the following solution for 2 minutes:

| | |
|---|---|
| Sodium Sulphite (Anhydrous) | 30 g |
| Hydroquinone | 10 g |
| Sodium Carbonate | 60 g |
| Water to | 1000 ml |

Bleaching then took place in a bleach of the following composition for 2½ minutes.

| Fe(NO₃)₃ 9H₂O | 30 g |
|---|---|
| KCl | 4 g |
| Water to | 1000 ml |

When bleaching was complete, the sample was removed from the bleach, washed for 1 minute, and fixed in a solution containing 50 g/l sodium sulphite for 3 minutes. Finally the sample was washed and dried.

The resulting phase hologram had a brightness of approximately 20% and a scatter value of less than 2%. The replay wavelength was 470 nm in one test but it varied with the exposure in other tests.

These results compare favourably with figures obtained from similar holographic material which had been bleached using an ecologically unacceptable acid dichromate bleach bath.

We claim:

1. A method of preparing a hologram which comprises subjecting holographic material to a holographic exposure, the holographic material comprising silver halide emulsion of which at least 80% by weight of the halide is bromide, developing the exposed material in a silver halide developing solution to yield developed silver, converting the developed silver to silver chloride using a bleaching agent selected from ferric ions from ferric salts of acids, persulphate ions, chlorate ions, peroxides and water-soluble quinones, in the presence of chloride ions and then fixing out the silver chloride using a silver halide fixing agent which dissolves silver chloride but not silver bromide or silver iodobromide under the conditions of use.

2. A method according to claim 1 wherein the silver halide fixing agent is a water soluble sulphite.

3. A method according to claim 2 wherein the water soluble sulphite is sodium sulphite.

4. A method according to claim 1 wherein the bleaching agent is a ferric salt.

5. A method according to claim 4 wherein the ferric salt is ferric nitrate.

6. A hologram obtained by the method claimed in claim 1.

* * * * *